United States Patent
Judd

(10) Patent No.: US 7,580,377 B2
(45) Date of Patent: Aug. 25, 2009

(54) SYSTEMS AND METHOD OF DATALINK AUDITORY COMMUNICATIONS FOR AIR TRAFFIC CONTROL

(75) Inventor: Thomas D. Judd, Woodinville, WA (US)

(73) Assignee: Honeywell International Inc., Morristown, NJ (US)

( * ) Notice: Subject to any disclaimer, the term of this patent is extended or adjusted under 35 U.S.C. 154(b) by 549 days.

(21) Appl. No.: 11/355,486

(22) Filed: Feb. 16, 2006

(65) Prior Publication Data

US 2007/0189328 A1    Aug. 16, 2007

(51) Int. Cl.
*H04B 7/00*     (2006.01)
(52) U.S. Cl. .................. 370/277; 340/945; 340/963; 340/971; 370/466; 704/257; 704/270; 704/270.1
(58) Field of Classification Search ......... 370/464–466; 455/73, 550.1, 563; 340/945, 963, 971; 701/1, 701/3, 4, 8, 9, 14; 704/200, 231, 251, 255, 704/257, 270, 270.1
See application file for complete search history.

(56) References Cited

U.S. PATENT DOCUMENTS

| 6,175,314 | B1 |   | 1/2001 | Cobley |
| 6,246,672 | B1 | * | 6/2001 | Lumelsky ............... 370/310 |
| 2003/0006910 | A1 | * | 1/2003 | Dame ..................... 340/945 |
| 2004/0263381 | A1 |   | 12/2004 | Mitchell et al. |
| 2006/0229873 | A1 | * | 10/2006 | Eide et al. .............. 704/260 |
| 2008/0159491 | A1 | * | 7/2008 | Kelley et al. ........... 379/88.16 |

FOREIGN PATENT DOCUMENTS

EP    1435605    7/2004

* cited by examiner

*Primary Examiner*—William Trost, IV
*Assistant Examiner*—Charles C Jiang
(74) *Attorney, Agent, or Firm*—Fogg & Powers LLC

(57) ABSTRACT

A system and method for engaging in two-way communication between a pilot and an air traffic controller by speech and hearing processes wherein spoken messages are compared to a database of categorized messages for matching and selecting a categorized message for transmission between pilot and air traffic control.

19 Claims, 10 Drawing Sheets

SYSTEMS AND METHOD OF DATALINK AUDITORY COMMUNICATIONS FOR AIR TRAFFIC CONTROL

BACKGROUND OF THE INVENTION

Pilots operating an aircraft face an array of instrumentation and controls. Instrumentation and controls often times provide a major distraction to the pilot. This distraction can be very serious as the pilot approaches restricted or congested air space, as occurs in the travel lanes approaching an airport. For example, current displays are often cluttered with email-like messages that demand a pilot's, or ground controller's attention. There exists a need for systems and procedures that can reduce or virtually eliminate the pilot's or controller's distraction from flying and monitoring the status of the aircraft so that safety is improved to everyone onboard the aircraft and the operational efficiency of aircraft monitoring is enhanced.

BRIEF SUMMARY OF THE INVENTION

A system and method of communication utilizing auditory and speaking processes between transmission and reception locations that utilize digital data linked communications including but not limited to communication between a pilot and air traffic controller.

BRIEF DESCRIPTION OF THE SEVERAL VIEWS OF THE DRAWINGS

The preferred and alternative embodiments of the present invention are described in detail below with reference to the following drawings.

DETAILED DESCRIPTION OF THE INVENTION

Figure 1A:
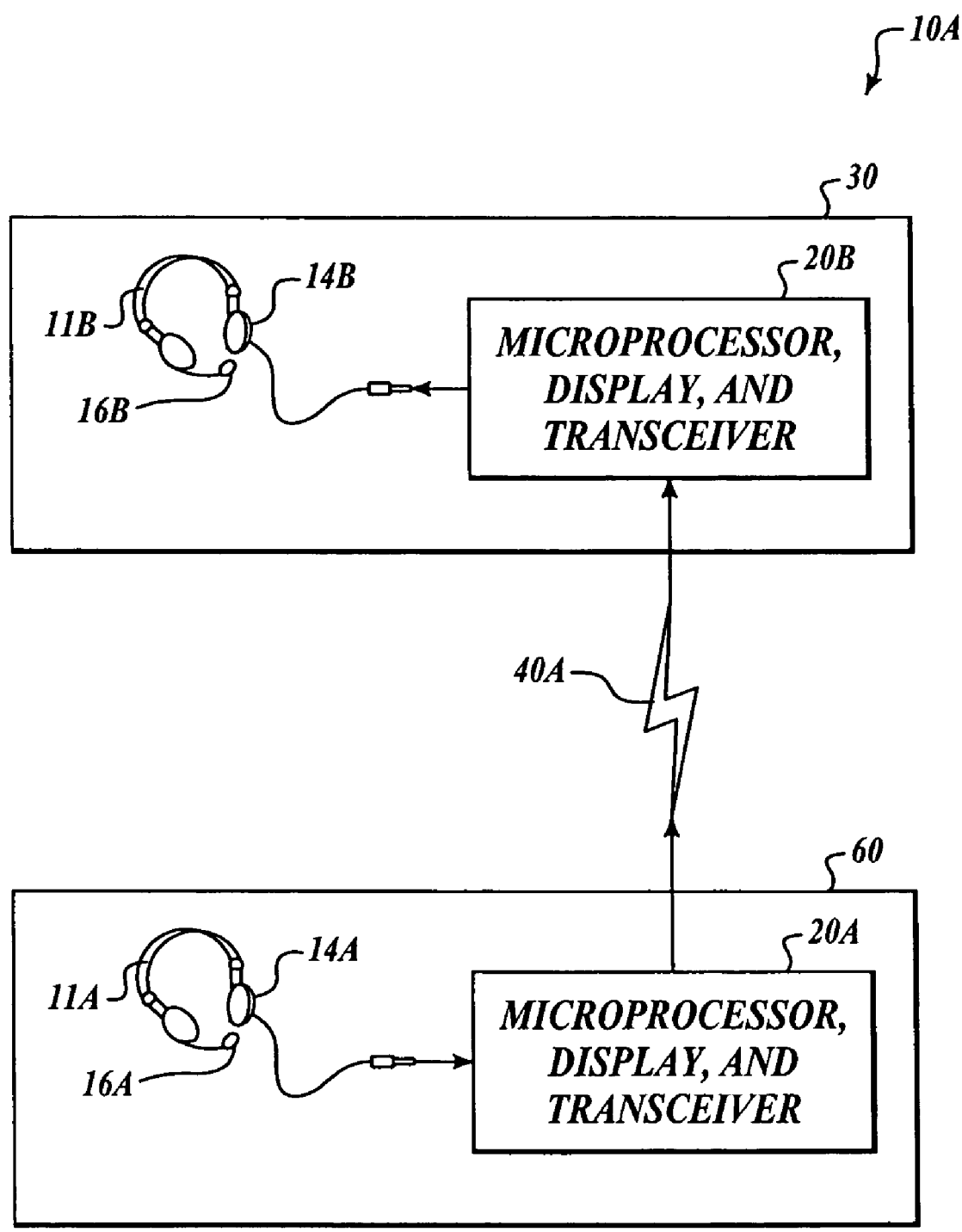
FIG. 1A is a schematic of an uplink communication from the controller to the pilot.

The communication systems and methods as will be described apply to any two-way communication between a transmitter and recipient. More particularly, the two-way communication systems include enhancements that improve the communication that occurs between aircraft pilots and air traffic control centers controllers. The enhanced system and method employs speech and auditory processes that are digitally sent, received, and processed such that distraction to the pilot or air traffic controller is minimized. The enhanced system and method converts aviation related messages and protocols spoken by a pilot or air traffic controller that is consistent in meaning to the messages used in Controller Pilot Data Linked Communications (CPDLC). The CPDLC messages are fully described in Safety And Performance Requirement Standards for Air Traffic Data Link Services In Continental Airspace (RTCA/DO-290, Apr. 29, 2004, RTCA Inc.), Interoperability Requirements Standard For ATN Baseline 1, Revision A (DO-280A/EUROCAE ED-110A, Nov. 19, 2004, RTCA Inc.) and Guidance Material For ATS Data Link Services In North Atlantic Airspace (Version 12.0, May 19, 2005, ScOACC, UK), incorporated by references as if fully disclosed herein. In the references above are Standards and Recommended Practices (SARPS) for CPDLC based communication.

In a particular embodiment, a pilot's or ground controller's spoken aviation-related messages having phraseologies relating to aircraft and ground control operations are converted to digitized messages. The aircraft and ground operations include CPDLC procedures applicable during busy times as occurs preparing for and during take offs and landings, as well as during the less busy times while the plane is enroute between airports. The digitized messages are matched to at least one standardized message among sets of standardized messages stored in a microprocessor-executed device. For example, the sets of standardized messages include but is not limited to CPDLC up-linked (UM) and down-linked (DM) messages as described in the referenced RTCA/DO-290 and Version 12.0 documents above. The matched standardized message is presented on a display and is either up-linked communicated to the aircraft or down-linked communicated to the air traffic control center. The displayed message is converted to speech and is listened to by the pilot or ground controller.

Uplinked messages sent from controller to pilot is converted from text to speech so that it is audible by the pilot, and spoken messages from the pilot that are destined to be sent to the controller are converted from speech to text. Either uplink messages from the controller or messages intended for downlink transmission from the pilot to controller are presented on an alphanumerical display for confirmation. The messages either uplinked from the controller or messages intended for downlink transmission from the pilot to the controller are selected according to different flight requirements while the aircraft or center is in operation.

The aircraft and aircraft controller communication systems and methods are further described with reference to the figures below.

FIG. 1A is a schematic of an uplink communication system 10A from a controller to the pilot. The system 10A includes a headset 11B that is worn by a pilot in an aircraft 30 and a headset 11A worn by an air traffic controller in an air traffic control center 60. Each headset 11A and 11B includes at least one speaker 14 and a microphone 16. A controller wearing headset 11A in the air traffic control center 60 speaks into the microphone 16. The microphone 16 and speaker 14 are connected to a microprocessor display and transceiver 20A. The transceiver 20A is in communication with a radio transmission tower 40 that emits an uplink signal 40A to be received by the aircraft 30. In the aircraft 30, a microprocessor display and transceiver 20B receives the uplink signal 40A and presents an audio equivalent through the speaker 14 of the pilot headset 11B.

Figure 1B:
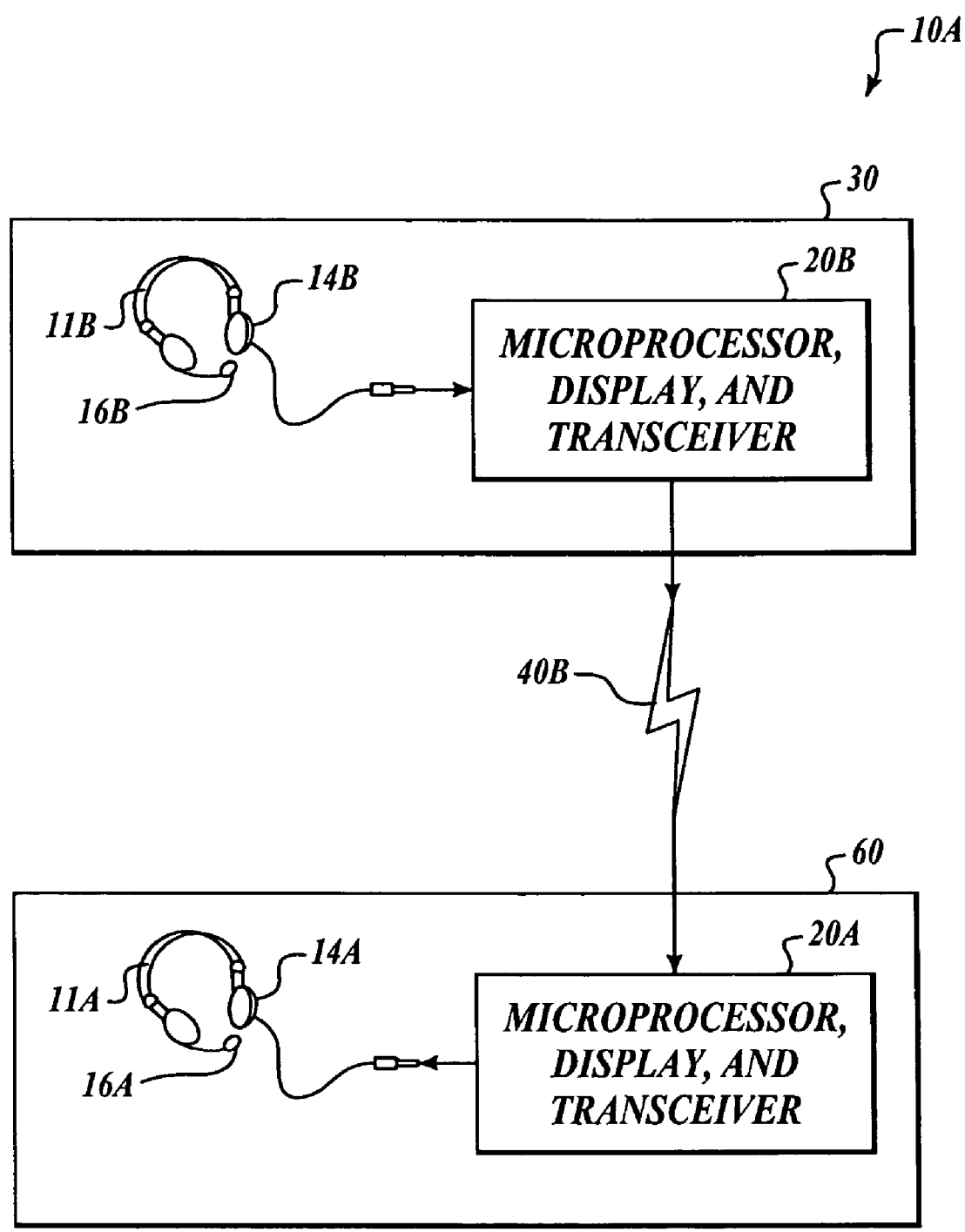
FIG. 1B is a schematic of a downlink communication from the pilot to the controller.

FIG. 1B is a schematic of a downlink communication from the pilot to the controller. As shown, the communication system 10B yields a downlink signal 40B from the aircraft 60.

The pilot talks into the speaker 16 which is sent to the device 20B. The device 20B transmits and sends out the downlink radio transmission signal 40B the tower 40 which in turn relays the received signal 40B to the device 20A.

Figure 2:
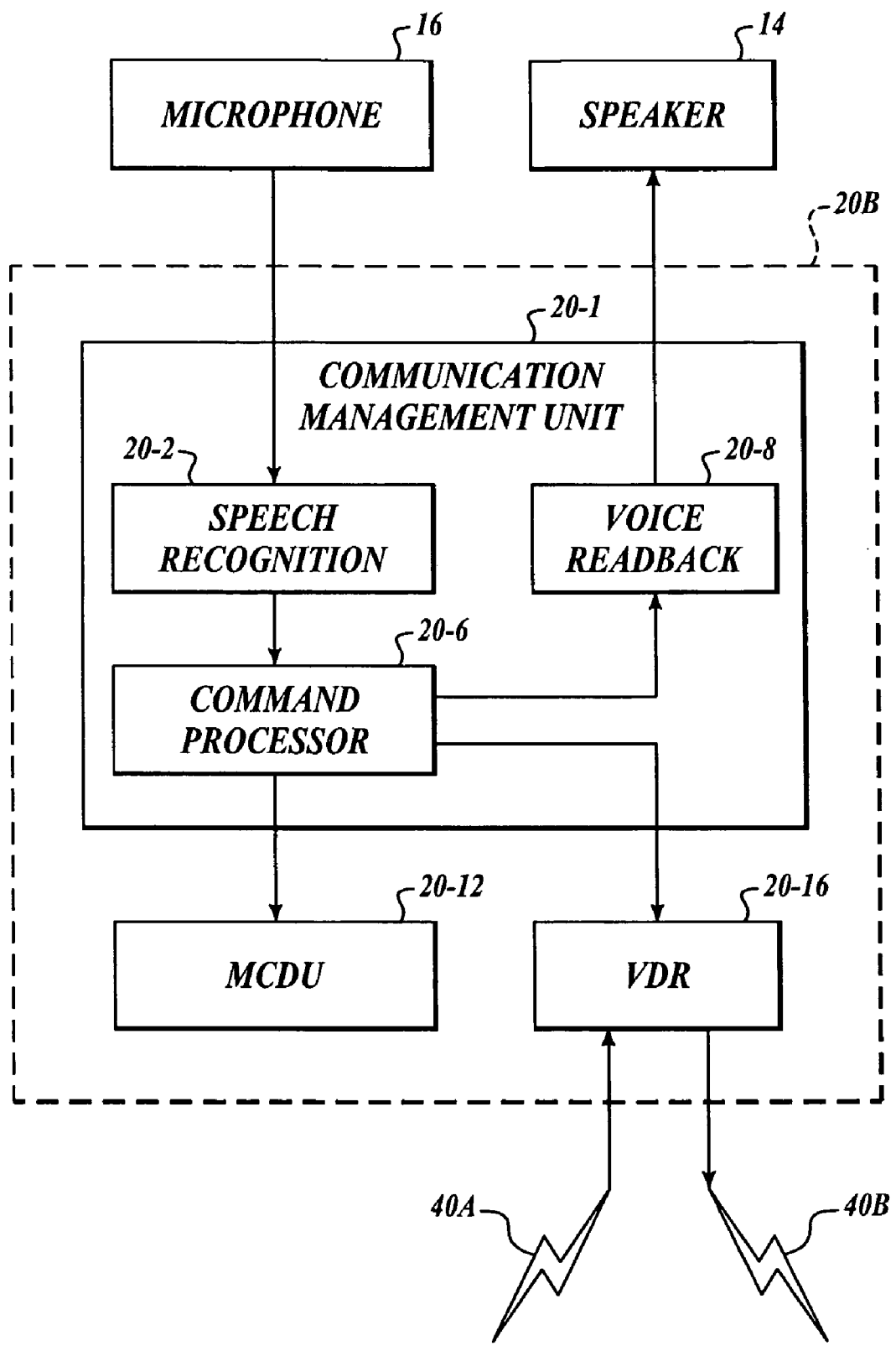
FIG. 2 is schematic diagram of a microprocessor and a transceiver of an aircraft used for transmission of downlink signals or reception of uplink signals from and to a center.

FIG. 2 is schematic diagram of microprocessor and transceiver 20B of aircraft 30 used for transmission of downlink signals 40B or reception of uplink signals 40A from and to the center 60. The microphone 16 and speaker 14 are in data communication with a Communications Management Unit (CMU) 20-1. The CMU 20-1 is also in signal communication with a Multi-Purpose Control Display Unit (MCDU) 20-12 and a Very High Frequency Digital Radio (VDR) 20-16 as described below. The MCDU 20-12 provides the interface between the pilot and the CMU 20-1.

The CMU 20-1 includes a speech recognition processor 20-2 in signal communication with the microphone 16, a command processor 20-6 in signal communication with the speech recognition processor 20-2, and a voice read-back processor 20-8 in signal communication with the command processor 20-6 and the speaker 14. The command processor 20-6 in turn is in signal communication with the voice read-back processor 20-8 and separately with the MCDU 20-12 through which the pilot interacts, and separately in signal communication with the VDR 20-16. The VDR 20-16 generates and transmits a downlink radio signal 40B or receives and conveys an uplink radio signal 40A transmitted by center 60. The MCDU may include a Multi-Function Display (MFD).

Figure 3:
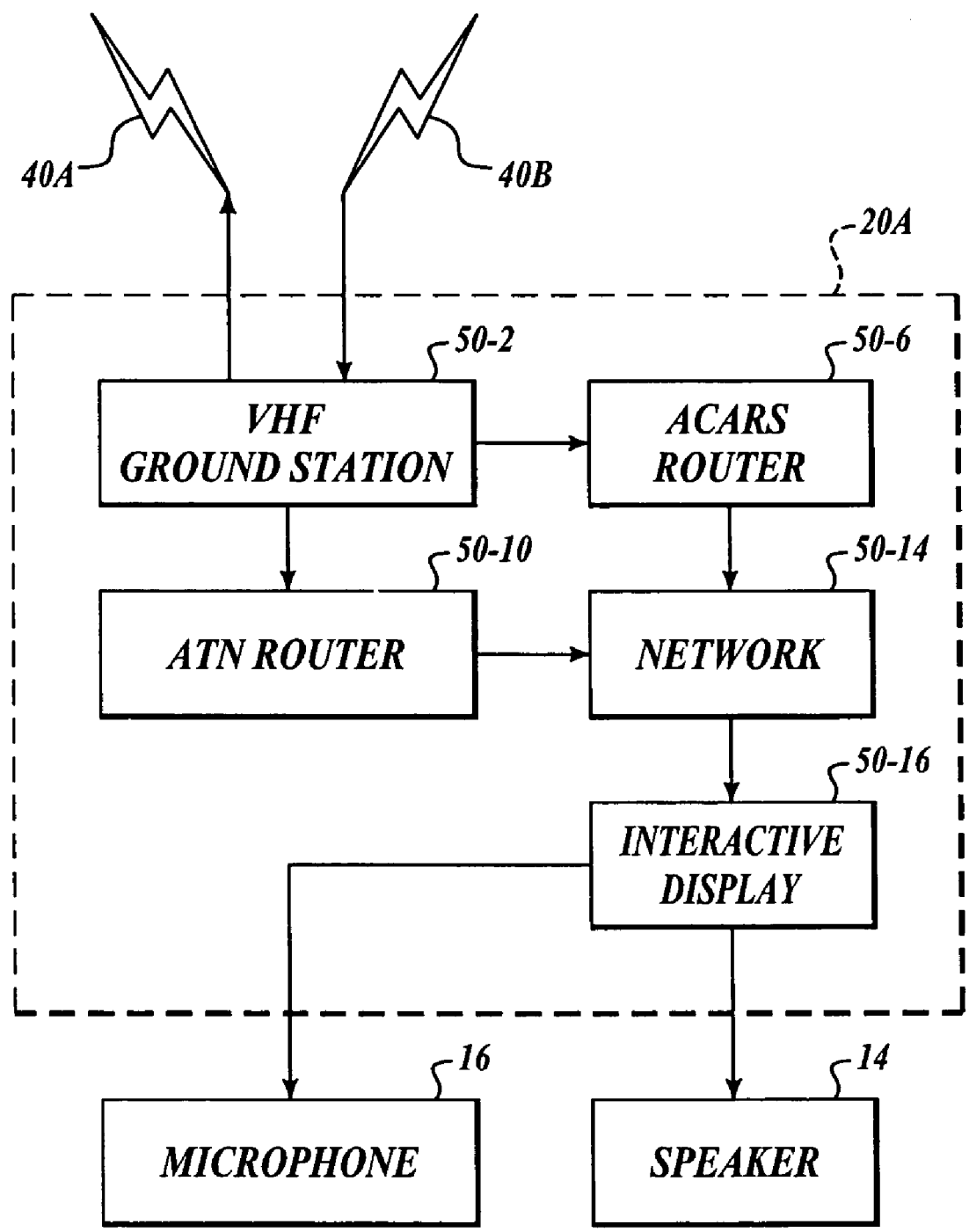
FIG. 3 illustrates components of the microprocessor and transceiver of center used for reception of downlink signals 40B or transmission of uplink signal from and to the aircraft.

FIG. 3 illustrates components of the microprocessor and transceiver 20A of center 60 used for reception of downlink signal 40B or transmission of uplink signal 40A from and to the aircraft 30. The downlink electro magnetic signal 40B is received by the microprocessor and transceiver 20A using a Very High Frequency (VHF) ground station 50-2. Alternately the device 20A may also be a High Frequency (HF), SATCOM, Gatelink, Broadband Satellite, or datalink sub-networks. The informational content of the transmission 40B is routed through the VHF 50-2 and sent to an Airborne Communication Addressing and Reporting System (ACARS) router 50-6 or an Aeronautical Telecommunications Network (ATN) router 50-10. The ACARS router 50-6 and the ATN router 50-10 both converge to a network 50-14. The network 50-14 in concert with the ACARS router 50-6 and the ATN router 50-10 serves to link other airline operational control centers managing near and far away aircraft. The network's ACARS and ATN routers 50-6,10 transmit dispatches and other aeronautical related information to other ATC centers that have or will have operational jurisdiction of a given aircraft 30 during its flight. The network 50-14 in turn is in signal communication with an interactive display 50-16 that serves similar auditory and visual interface tasks with the controller of center 60 as the MCDU 20-12 does for the pilot of aircraft 30. The interactive display 50-16 in turn is in data communication with the air traffic controller's headset 11, wherein, as described below, speech-to-text processes are engaged with the microphone 16 and text-to-speech processes are engaged with the speakers 14.

Figure 4:
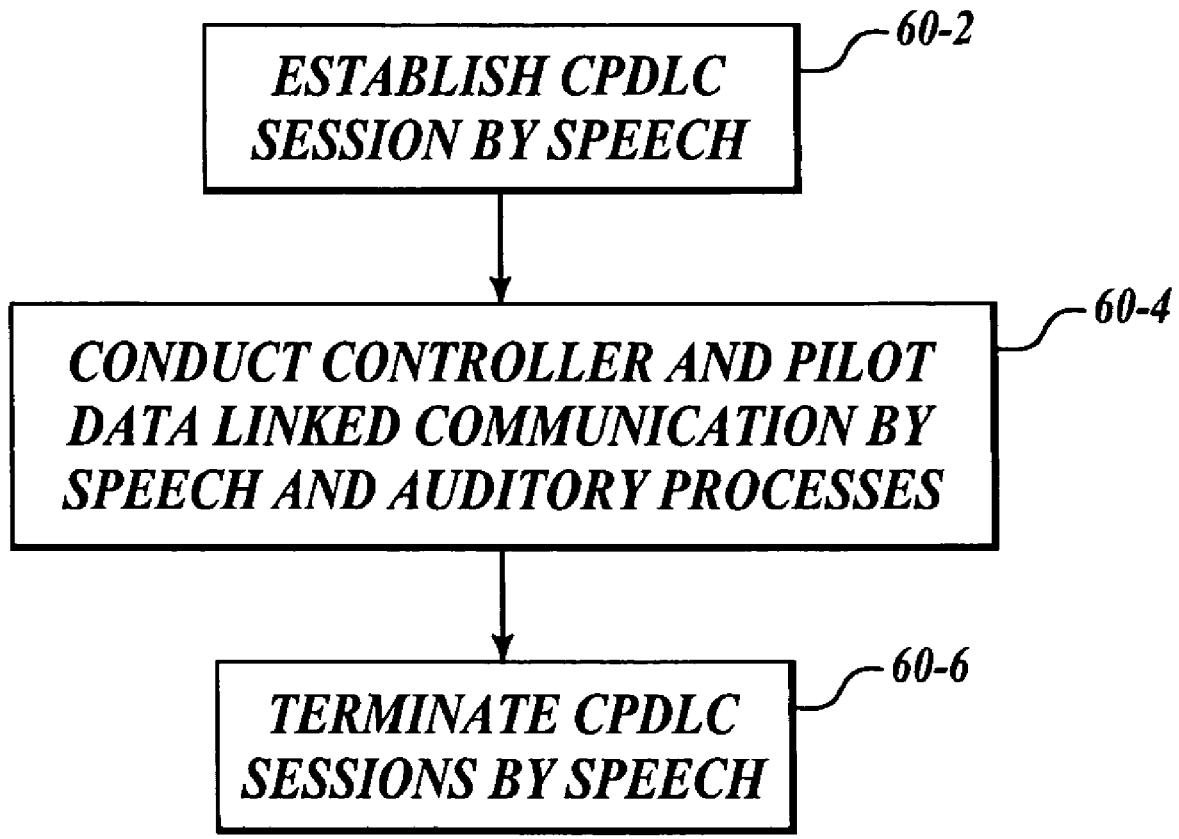
FIGS. 4-6 are flowcharts of an example method for use in either the aircraft or the air controller's enhanced control pilot datalink system.

FIG. 4 is a method flowchart for use in either the aircraft 30 or the air controller 60. The general method begins with block 60-2 where a CPDLC session is established by speech processes. Thereafter, at process block 60-4, the ground controller and the pilot conduct datalink communications by speech and auditory processes. Then the method concludes with process block 60-6 where the CPDLC session is terminated by a speech command.

Figure 5:
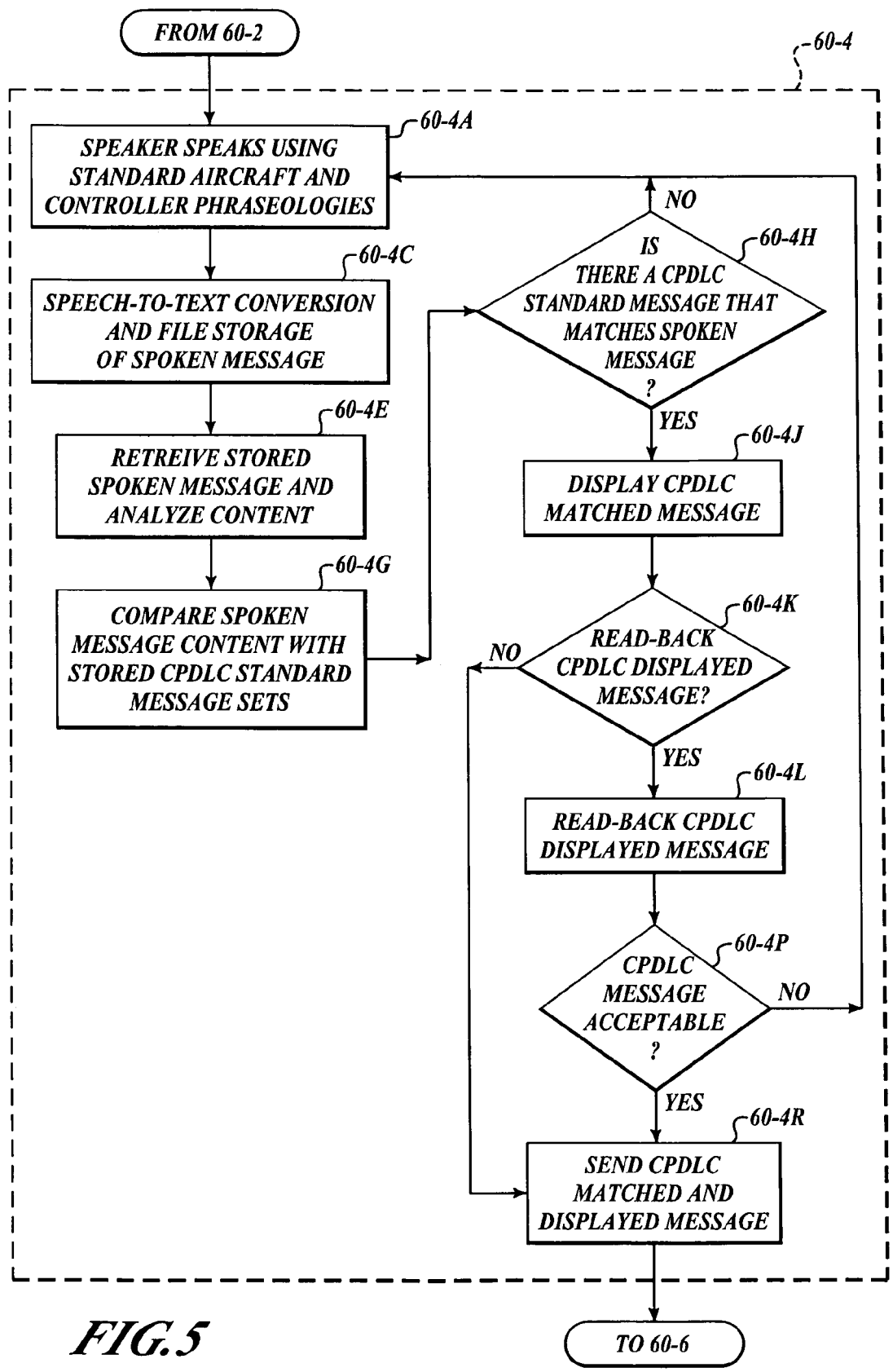

FIG. 5 is an expansion of sub-algorithm block 60-4 of FIG. 4. Beginning from block 60-2, block 60-4 includes several sub-algorithms. First, sub-algorithm block 60-4A where the pilot or air traffic controller talks using standard aircraft and control phraseologies consistent with controller-to-pilot uplinked (UM) and pilot-to-controller downlinked (DM) CPDLC messages that are classified according to reference numbers that address various stages of flight operations. For example, as described in the RTCA/DO-290 and Version 12 Documents above, reference numbers UM0-5 concern uplinked responses and acknowledgements, UM6-223 concern uplinked vertical clearances, DM0-5 concern downlinked response and acknowledgements, and DM6-10 concern downlinked vertical clearances. Some messages are automatically generated, for example logical acknowledgement (LACK), DM99 CDA, and others. Other UM and DM CPDLC reference number sets concern other flight operations, such as speed requests, route modification requests, reports, negotiations, emergency messages, etc. In the standard UM and DM messages are phraseologies or message elements having key words that are subsequently be used as triggers for matching with CPDLC reference numbers.

As the controller or pilot speaks the message elements of the respective UM or DM referenced CPDLC messages into the microphone 16, there is a speech-to-text conversion that occurs at the next block 60-4C along with file storage of the spoken message. The speech-to-text conversion may be achieved by microprocessors configured to run executable programs such as NaturallySpeaking 8 available from Nuance, Inc. (Burlington, Mass., USA). For example, if the pilot requests a weather deviation under CPDLC message DM27 up to a specified distance, the pilot speaks "Request weather Deviation Up To 10000 feet", wherein "weather deviation" in the partial phrase "weather deviation up to" serves to act as triggering keywords for identifying and selecting a DM27 CPDLC message that will be subsequently sent to a ground controller as discussed below. Similarly, a ground controller who has received the DM27 message speaks "Cleared to deviate up to 10000 feet", wherein the "Cleared to deviate" serves to act as triggering keywords for identifying and selecting a UM82 CPDLC message.

Continuing with FIG. 5, at block 60-4E, the message is retrieved from the stored file and is analyzed for key word content. At process 60-4G, the spoken message is compared with stored CPDLC standard message sets, for example the uplinked messages (UM) or downlinked messages (DM) depending if the user is a pilot in aircraft 30 or controller in center 60. The UM and the DM are structured in a defined format with a column designated for intent or use of the UM or DM message element statements. A given message element statement for a given codified UM or DM is contained within bounded brackets that designates words that may be spoken by the pilot or controller that are consistent with the intent or use of the codified UM or DM communications. The bracketed message is interpreted by software utilizing Packed Encoding Rules (PER) under Abstract Syntax Notation-1 (ASN-1) as described in the SARPS of the referenced in the RTCA/DO-290 and Version 12.0 documents cited above. The meaning of a speaking pilot or speaking ground controller phraseologies are ranked according to contextual meaning under utilizing the PER standards. Contextual management of the stored CPDLC contextual-ranked message sets is established by retrieving from a database and comparing keyword triggers of the pilot's or controller's spoken message, at block 60-4H to determine if there is a CPDLC standard message that matches the spoken message. If the result of block 60-4H is no, then the process returns back to block 60-4A where the user presents another message. If the result is yes, that there is a match, then at process block 60-4J the CPDLC matched message is displayed on the MCDU 20-12.

Once the message is displayed, another decision diamond is reached at decision diamond 60-4K, which determines if the system is to read-back the CPDLC displayed message. If no, then at process block 60-4R, the CPDLC match message that is displayed is sent out as a radio transmission uplink signal 40A or downlink signal 40B. If yes, the matched CPDLC message that is displayed is read back at process block 60-4L. The read back process utilizes text-to-speech conversion that may be achieved microprocessors configured to run executable programs such as Vocalizer 4.0 available from Nuance, Inc. (Burlington, Mass., USA). Thereafter, another decision diamond 60-4P is reached in the algorithm in which the query is presented whether or not the CPDLC message is acceptable to the user. If it is acceptable, the process at block 60-4R is performed and the matched CPDLC message is outputted as a radio transmission signal 40A or 40B. If the message is not acceptable, then the process returns to block 60-4A where the user speaks another message. An alternate embodiment of the matched algorithm allows for secondary, tertiary and other ranking CPLDC messages with the spoken message to be offered for the pilot's or the air traffic controller's consideration as an appropriate message using software algorithms that rank the message elements by PER and ASN-1

Figure 6:
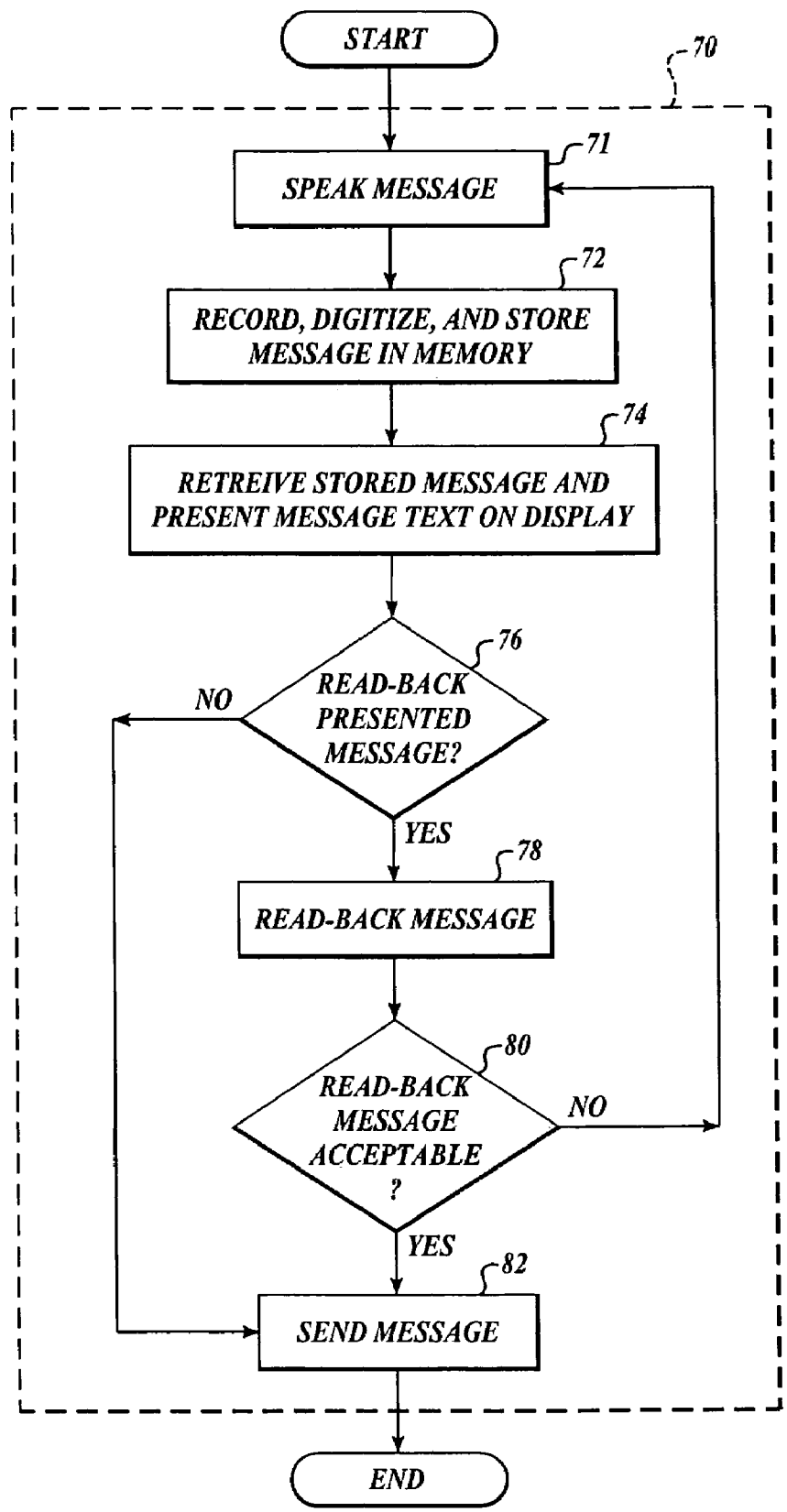

FIG. 6 is an alternate process 70 for establishing, conducting, and terminating a CPDLC session. The process begins at block 71 with a message that is spoken. The spoken message is recorded, digitized and stored in memory. Retrieval of the message occurs at block 72 and the message is presented as displayed text on the MCDU 20-12, see block 74. A decision diamond 76 then follows with a query whether or not to read back the presented message. If the answer is "no", then at block 82 the message is sent out as either uplink signal or downlink signal. If the query is "yes" to read back the message, then at process block 78, the message is read back which is followed again by a query if the read-back message is acceptable, see decision diamond 80. If the message is acceptable, then the message is sent at process block 82 as either uplink signal or downlink signal or alternatively, if the answer is "no", a message "No CPDLC message" is presented to the operator. Upon hearing "No CPDLC message", the pilot or ground controller speaks a new message at process block 71 and the process 70 repeats. The methods of FIGS. 5 and 6 may also be applied to the voice-activation of screen regions or image icons located on the MCDU 20-12 display 20a located in the aircraft 30, or other display located in the center 60, for example push button icons, that result in the sending of signals 40A and/or 40B.

Figure 7:
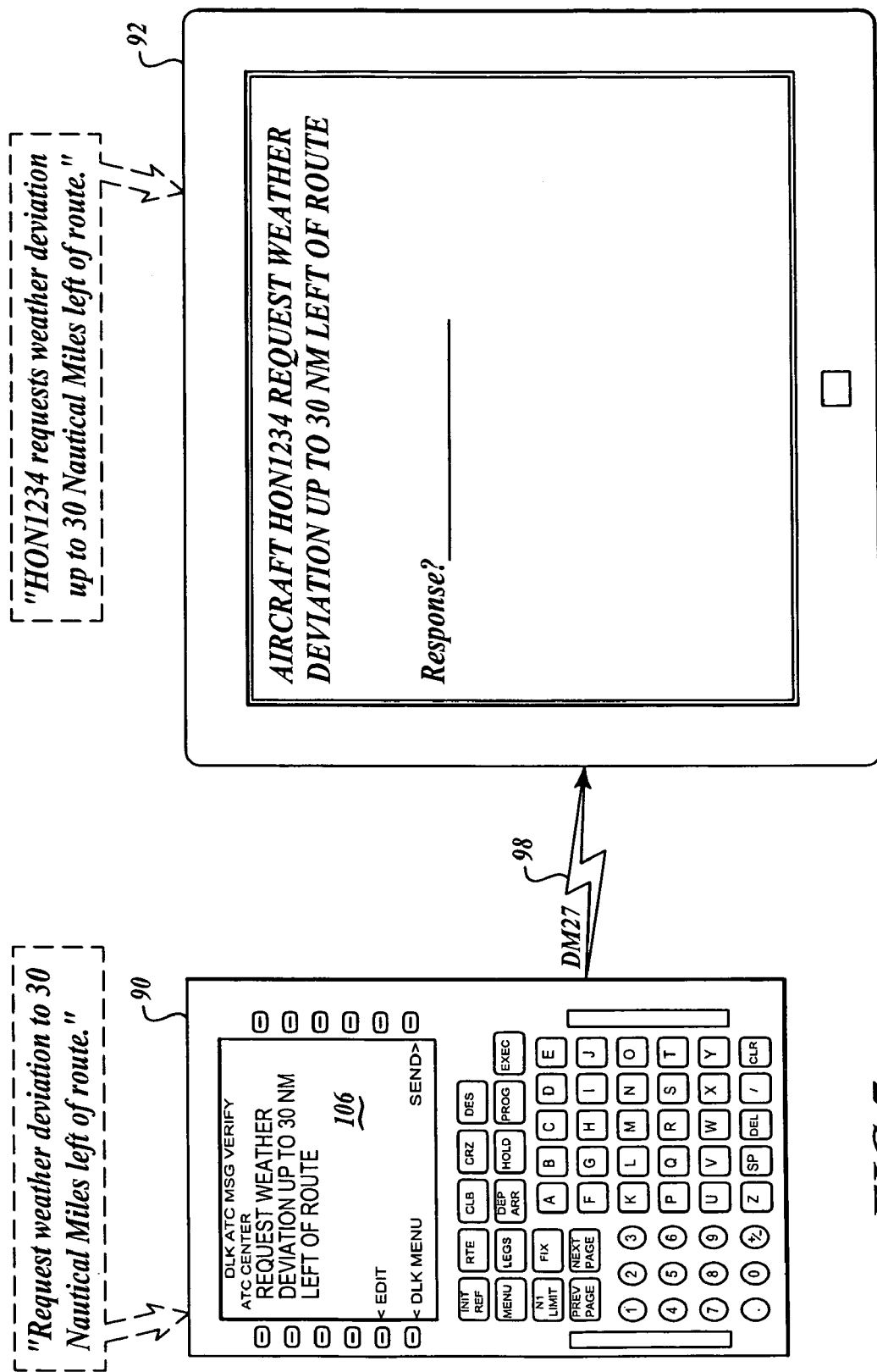
FIG. 7 schematically depicts a downlink communication request contained within a signal from the pilot using auditory and speaking processes conducted during a communication session to the air traffic controller.
Figure 8:
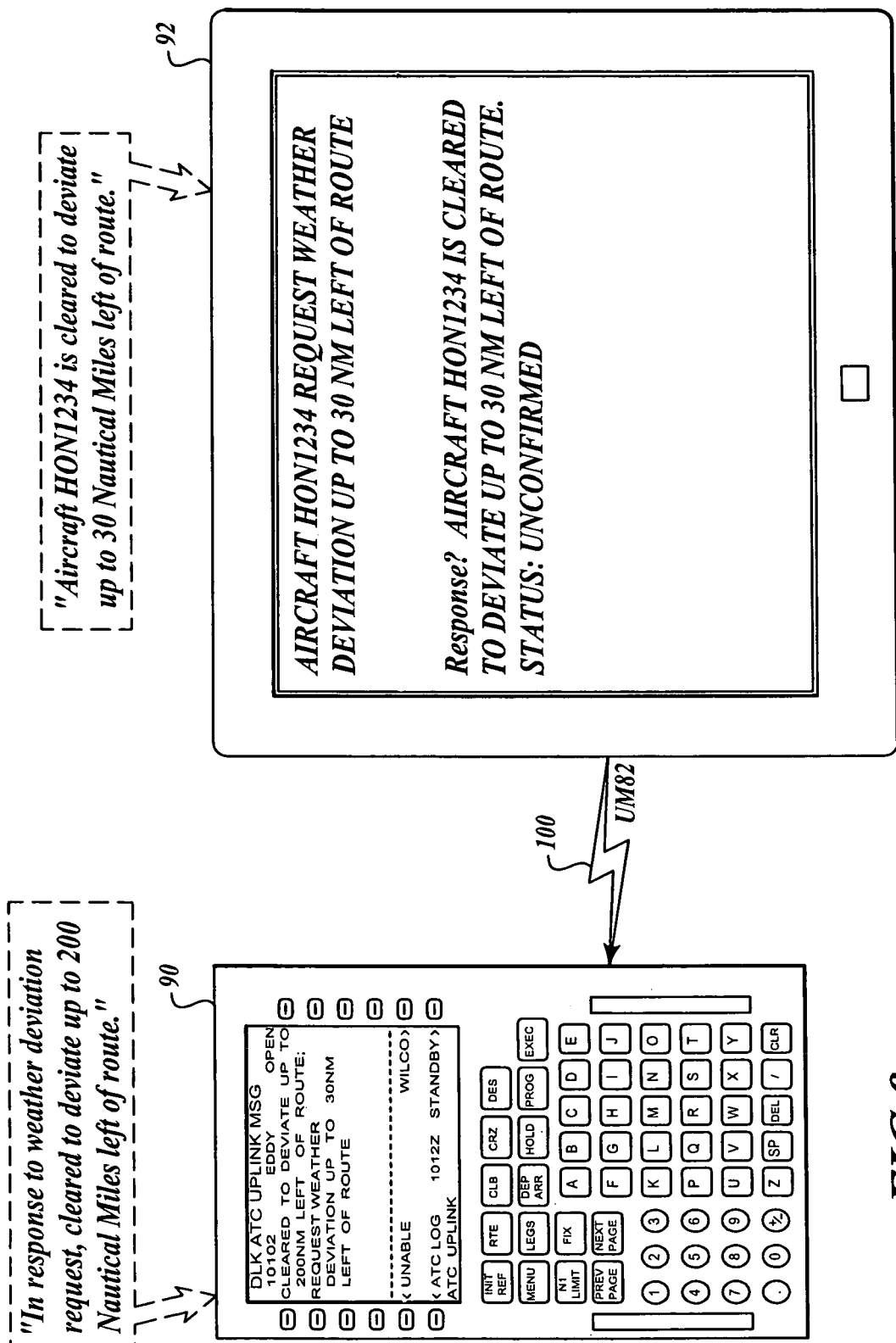
FIG. 8 schematically depicts an uplink communication response conveyed in a signal from the controller to pilot's query of FIG. 7.
Figure 9:
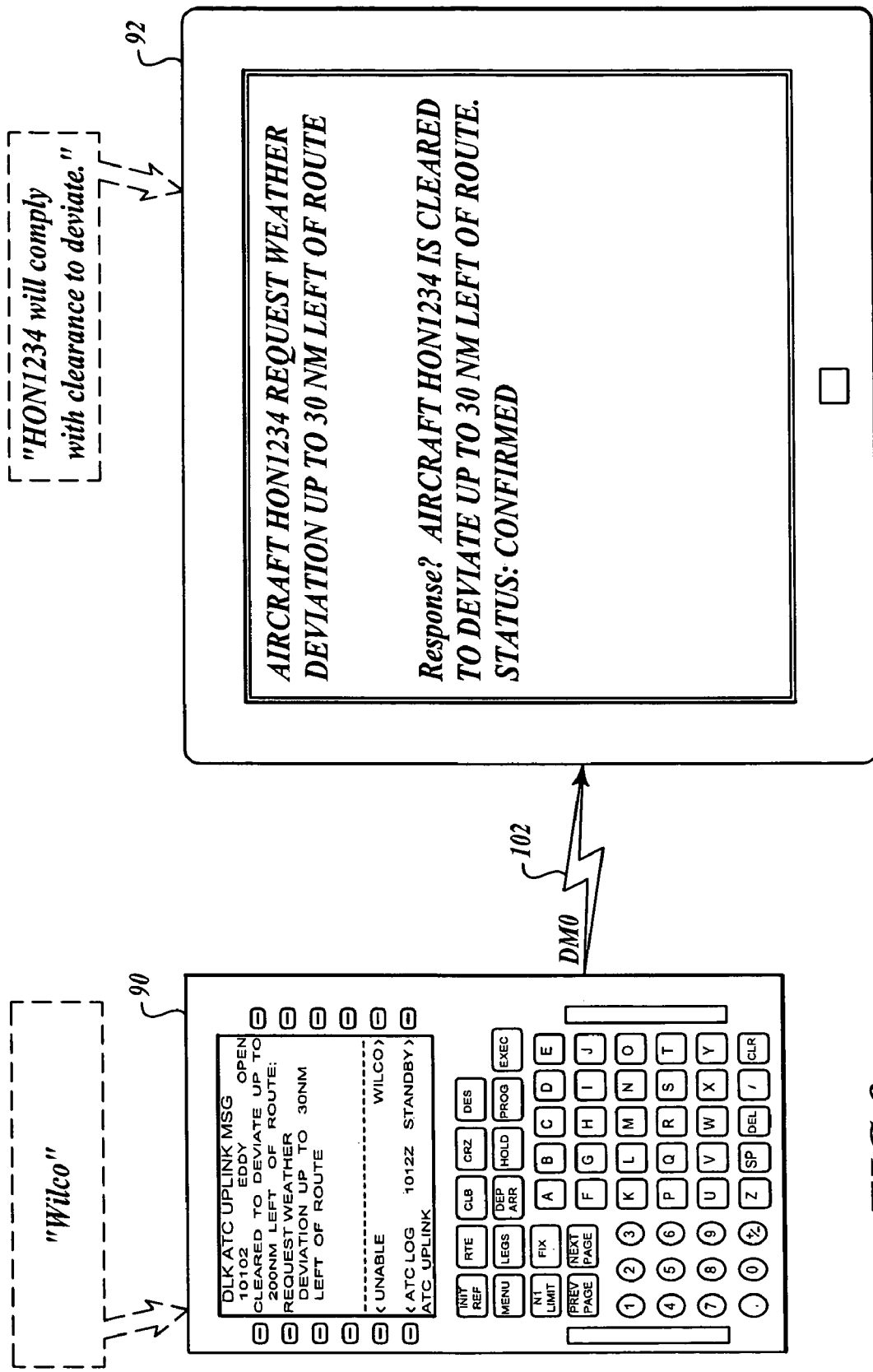
FIG. 9 schematically depicts a downlink confirmation response conveyed in a signal from the pilot to the controller's response of FIG. 8.

FIGS. 7-9 depict an example of the application of the system and methods of the voice triggered CPDLC messages occurring between the pilot in the aircraft 30 and controller in the air traffic center 60. Messages from both pilot and controller are shown depicted in a MCDU 90 and an interactive display 92 of the respective aircraft 30 and aircraft control center 60. The scenario series as depicted include a pilot initiated request conveyed in a CPDLC downlinked message contained within a signal 98, a controller response conveyed with a CPDLC uplink message contained within an uplink signal 100, and a confirmation from the pilot in a follow-up downlink message contained within downlink signal 102.

FIG. 7 schematically depicts a downlink communication request contained within signal 98 from the pilot using auditory and speaking processes conducted during a CPDLC session to the air traffic controller. In this scenario, the pilot is requesting a flight deviation for a specified nautical mile (NM) range. The downlink signal 98 from the aircraft 30 contains a matched CPDLC statement DM27 as a consequence of the pilot speaking "Request weather deviation up to 30 nautical miles left of route" into the pilot's microphone 16B that is speech-to-text converted and presented on the MCDU 90 as pilot screen view 106. The alphanumeric text of the pilot's spoken statement in screen view 106 is presented as REQUEST WEATHER DEVIATION UP TO 30 NM LEFT OF ROUTE and is available for pilot viewing or read-back to the pilot on the pilot's speaker 14B. Once the message is reviewed (e.g., aural read-back or display) then the pilot says "Send", which sends the downlink message to the ATC Controller.

In the aircraft 30, the downlink signal 98 is processed and presented on the interactive display 92 as AIRCRAFT HON1234 REQUEST WEATHER DEVIATION UP TO 30 NM LEFT OF ROUTE. In the control center 60, the controller is then presented with a text-to-speech conversion of the displayed controller message, see call-out window. In one embodiment abbreviations are vocally converted to the non-abbreviated version (e.g. NM=nautical miles). Beneath the received message is a prompt "Response?" to remind the controller to prepare a voice-triggered CPDLC response message to the pilot's query.

FIG. 8 schematically depicts an uplink CPDLC communication response conveyed in signal 100 from the controller to pilot's query of FIG. 7. In this case, the controller speaks "Aircraft HON1234 is cleared to deviate up to 30 nautical miles left of route" into controller's microphone 16 that is subsequently speech-to-text converted. Information from the controller response is sent to the aircraft 30 in CPDLC standard message UM82 in the uplink signal 100. The controller's spoken message is processed through a voice recognition processor and is presented adjacent to the "Response?" as AIRCRAFT HON1234 IS CLEARED TO DEVIATE UP TO 30 NM LEFT OF ROUTE. Status is also indicated—unconfirmed.

In aircraft 30, uplink signal 100 is received, processed, and presented on the MCDU 90 as alphanumeric text AIRCRAFT HON1234 IS CLEARED TO DEVIATE UP TO 30 NM LEFT OF ROUTE. In the aircraft 30, the pilot then hears the text-to-speech conversion, see the call-out window above the MCDU 90. The pilot then readies a confirmation message to controller's response to pilot's query.

FIG. 9 schematically depicts a downlink CPDLC confirmation response conveyed in signal 102 from the pilot to the controller's response of FIG. 8. In response, pilot responds "Wilco", meaning will comply, into pilot's microphone 16B and the speech to text message is presented on the MCDU 90 as WILCO. The information content for "Wilco" is conveyed to controller at center 60 via CPDLC downlink message DM0 contained within downlink signal 102. Pilot confirmation is displayed as status: CONFIRMED on the interactive display 92. The pilot confirmation is converted to speech, see call-out window above the interactive display 92 ("HON1234 will comply with clearance to deviate.").

The foregoing examples covered in FIGS. 7-9 may also apply to ATC Logon and establishment of CPDLC connections. Moreover, some messages that require short responses like "Notify", "Logon", "Perform Logon", "Roger", "Affirm", "Accept", "Reject" before a message is sent may be reviewed by the speaking pilot or speaking ground controller and have the option to say "send", "cancel", or "respond later".

While the particular embodiments of the invention have been illustrated and described, as noted above, many changes can be made without departing from the spirit and scope of the invention. For example, voice recognition with or without alphanumeric or biologically based passwords or identifiers may be employed as a security measure to identify the speaking pilot or ground controller instead of speech recognition which doesn't necessarily identify the speaker. Moreover, the enhanced system and method for air traffic control permits a single aircraft having multiple CPDLC logons and sessions with more than one ATC. Similarly, a single ATC controller may have multiple CPDLC sessions with more than one aircraft. This multi-session CPDLC process may be accomplished by the respective speaking pilot or air traffic controller voicing the designation or ID numbers of the appropriate ATC or aircraft entity. Accordingly, the scope of the invention is not limited by the disclosure of the preferred embodiment. Instead, the invention should be determined entirely by reference to the claims that follow.

What is claimed is:

1. A communication system comprising:
   a microphone;
   a speaker;
   a microprocessor device to convert a spoken message delivered to the microphone by a speaking user to a digitized message;
   a database accessible by the microprocessor device having a plurality of stored commands for matching with the digitized message;
   a microprocessor-executable program configured to select a standard message from the plurality of stored commands according to a classification of aviation phraseologies that match one or more elements of the digitized message, wherein the one or more elements of the digitized message are ranked by the microprocessor-executable program in reference to one or more stages of flight operation;
   a display for presenting the selected standardized message;
   a first transceiver for sending the selected message to a recipient; and
   a second transceiver for receiving the selected message, wherein the selected message is received by the recipient and converted to an auditory form deliverable by the speaker for listening by the recipient.

2. The system of claim 1, wherein the microprocessor device is configurable by executable programs to convert speech to text.

3. The system of claim 1, wherein matching includes content matching programs executable by the microprocessor to compare the digitized message with the content of the stored commands.

4. The system of claim 3, wherein the content matching program further includes algorithms to select and rank the stored commands in order of closeness to the content meaning of the spoken message.

5. The system of claim 4, wherein closeness of content includes contextual meaning for uplink and downlink Controller Pilot Data Linked Communications (CPDLC) messages.

6. The system of claim 4, wherein the contextual meaning of CPDLC messages includes logon commands.

7. The system of claim 1, wherein the first transceiver is configurable to send a digital signal and the second transceiver is configurable to receive a digital signal.

8. The system of claim 1, wherein means the secondary transceiver includes a microprocessor component configured by executable programs to convert text to speech.

9. A communication system comprising:
   a microphone;
   a speaker;
   means for converting a spoken message delivered to the microphone to a digitized message;
   means for matching the digitized message with commands stored in a memory of the means for converting to select a standardized message closest in meaning of the spoken message according to a classification of aviation phraseologies consistent with one or more message elements used in Controller Pilot Data Linked Communications (CPDLC), wherein the one or more message elements selected from the digitized message are ranked in reference to one or more stages of flight operation;
   means for displaying the standardized message;
   means for sending the standardized message to a recipient; and
   means for receiving the standardized message;
   wherein the standardized message is received by the recipient and converted to an auditory form deliverable by the speaker for listening by the recipient.

10. The system of claim 9, wherein means for converting a spoken message to a digitized message includes a microprocessor device configurable by executable programs to convert speech to text.

11. The system of claim 9, wherein means for matching includes a microprocessor executed program to compare the digitized message with the content of the stored commands.

12. The system of claim 11, wherein the microprocessor executed program further includes algorithms to select and rank the stored commands in the form of up-linked and down-linked CPDLC messages in order of closeness to content meaning to the spoken message.

13. The system of claim 9, wherein means for sending the standardized message include cabled and wireless communication.

14. The system of claim 9, wherein the sending the standardized message include presenting the message on a speaking user display and reading back to the speaking user the presented message prior to sending the presented message.

15. The system of claim 9, wherein means for means for receiving the standardized message include a microprocessor device configurable by executable programs to convert text to speech.

16. A communication method between a speaking user and a recipient comprising:
   converting a spoken message into a digital message;
   matching the content of the digital message with the content of a plurality of standard Controller Pilot Data Linked Communications (CPDLC) messages, wherein the matched content of the digital message is ranked with the content of the standard CPDLC messages in reference to one or more stages of flight operation;
   selecting a standard message from the plurality of standard messages that is closest in content meaning to the digital message;
   presenting the selected message on a speaking user display;
   sending the selected message to a recipient;
   presenting the selected message on a recipient display;
   converting the selected message from the recipient display to auditory form; and
   sending the auditory form of the selected standard message to a speaker within hearing range of the recipient.

17. The method of claim 16, wherein the selected and presented message on the speaking user display is read back upon command of the speaking user.

18. The method of claim 16, wherein the standard messages include up-linked CPDLC commands that match the content of aviation phraseologies spoken by the speaking user.

19. The method of claim 16, wherein the standard messages include down-linked CPDLC commands that match the content of aviation phraseologies spoken by the speaking user.

* * * * *